US008493572B2

(12) United States Patent
Milvich

(10) Patent No.: US 8,493,572 B2
(45) Date of Patent: Jul. 23, 2013

(54) OPTICAL ENCODER HAVING CONTAMINATION AND DEFECT RESISTANT SIGNAL PROCESSING

(75) Inventor: Michelle Mary Milvich, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 435 days.

(21) Appl. No.: 12/774,686

(22) Filed: May 5, 2010

(65) Prior Publication Data

US 2011/0273725 A1  Nov. 10, 2011

(51) Int. Cl.
*G01B 11/14* (2006.01)
(52) U.S. Cl.
USPC .......................................... 356/616; 356/614
(58) Field of Classification Search
USPC ..................... 356/616, 237.3, 614
See application file for complete search history.

(56) References Cited

U.S. PATENT DOCUMENTS

| | | | |
|---|---|---|---|
| 4,385,836 A | 5/1983 | Schmitt | |
| 4,527,056 A | 7/1985 | Burkhardt | |
| 4,990,767 A | 2/1991 | Ernst | |
| 5,128,536 A | 7/1992 | Higashi | |
| 5,612,906 A | 3/1997 | Gotz | |
| 5,936,236 A | 8/1999 | Setbacken | |
| 5,956,659 A | 9/1999 | Spies | |
| 6,487,787 B1 | 12/2002 | Nahum | |
| 6,973,399 B1 | 12/2005 | Burgschat | |
| 7,126,109 B2 | 10/2006 | Goldman | |
| 7,199,354 B2 | 4/2007 | Mayer | |
| 7,250,881 B2 | 7/2007 | Kiriyama | |
| 7,276,687 B2 | 10/2007 | Okada | |
| 7,368,705 B2 | 5/2008 | Hare | |
| 7,608,813 B1 * | 10/2009 | Milvich et al. | 250/231.13 |
| 2004/0061044 A1 | 4/2004 | Soar | |
| 2007/0119933 A1 | 5/2007 | Chin | |

FOREIGN PATENT DOCUMENTS

JP   2003-65803 A   3/2003

OTHER PUBLICATIONS

Renze, John. "Outlier." From MathWorld—A Wolfram Web Resource, created by Eric W. Weisstein. http://mathworld.wolfram.com/Outlier.html, 2004.*

* cited by examiner

*Primary Examiner* — Gregory J Toatley
*Assistant Examiner* — Shawn Decenzo
(74) *Attorney, Agent, or Firm* — Christensen O'Connor Johnson Kindness PLLC

(57) ABSTRACT

An encoder configuration comprises an illumination portion, a scale comprising a scale track, and a signal processing electronics. The signal processing electronics may include a detector comprising a first set of three detector sub-portions that provide a first set of signals comprising three respective sub-portion signal subsets that have nominally the same signal characteristics when the scale track is not contaminated or defective. The processing electronics analyze the first set of signals and identify a least-similar sub-portion signal subset that has a corresponding signal characteristic value that is least similar to comparable signal characteristic values associated with more-similar sub-portion signal subsets of the first set of signals. Position measurements are based on valid signals including a plurality of the more-similar sub-portion signal subsets and not including the least-similar sub-portion signal subset if it is significantly different. Accurate measurement may be provided despite significant scale contamination or defects.

20 Claims, 6 Drawing Sheets

OPTICAL ENCODER HAVING CONTAMINATION AND DEFECT RESISTANT SIGNAL PROCESSING

FIELD OF THE INVENTION

The invention relates generally to precision position or displacement measurement instruments, and more particularly to an encoder configuration with signal processing which is resistant to errors that may be associated with a contaminated or defective portion of a scale.

BACKGROUND OF THE INVENTION

Optical position encoders determine the displacement of a readhead relative to a scale that includes a pattern that is detected by the readhead. Typically, position encoders employ a scale that includes at least one scale track that has a periodic pattern, and the signals arising from that scale track are periodic as a function of displacement or position of the readhead along the scale track. Absolute type position encoders may use multiple scale tracks to provide a unique combination of signals at each position along an absolute scale.

In various applications, scale manufacturing defects or contaminants such as dust or oils on a scale track may disturb the pattern detected by the readhead, creating errors in the resulting position or displacement measurements. In general, the size of errors due to a defect or contamination may depend on factors such as the size of the defect or contamination, the wavelength of the periodic pattern on the scale, the size of the readhead detector area, the relationship between these sizes, and the like. A variety of methods are known for responding to abnormal signals in an encoder. Almost all such methods are based on disabling the encoder signals, or providing an "error signal" to warn the user, or adjusting a light source intensity to boost low signals, or the like. However, such methods do not provide a means of continuing accurate measurement operations despite the abnormal signals that arise from certain types of scale defects or contamination. Therefore, these methods have limited utility. One known method that does mitigate the effects of scale contaminants or defects on measurement accuracy is disclosed in Japanese Patent Application JP2003-065803 (the '803 Application). The '803 Application teaches a method wherein two or more photo detectors output periodic signals having the same phase, which are each input to respective signal stability judging means. The signal stability judging means only outputs signals that are judged to be "normal," and "normal" signals are combined as the basis for position measurement. Signals that are "abnormal" are excluded from position measurement calculations. However, the methods of judging "normal" and "abnormal" signals disclosed in the '803 Application have certain disadvantages that limit the utility of the teachings of the '803 Application.

Improved methods for providing accurate measurement operations despite the abnormal signals that arise from certain types of scale defects or contamination would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to improved encoder configurations and methods for providing accurate measurement operations despite the abnormal signals that arise from certain types of scale defects or contamination. The '803 Application teaches that signal abnormalities should be judged based on previously determined "ideal" signal characteristics. However, such ideal criteria may be overly restrictive, or simply inadequate, under an unpredictable variety of operating conditions. The '803 Application also teaches the use of a number of signal characteristics that may only be determined based on sampling a signal over time. It is difficult or impossible to provide high speed "real time" measurement operations based on such signal characteristics. In contrast, the systems and methods disclosed herein do not require the assumption of "ideal" signal characteristics, and are well suited to high speed real-time measurement operations based on a single signal sample.

The present invention is directed to an encoder configuration usable to determine a relative position between a scale element and a detector along a measuring axis direction with reduced influence from the effects of scale track defects and contaminants.

In various embodiments, such an encoder configuration may comprise an illumination portion, a scale element including at least a first scale track including a first track pattern extending along the measuring axis direction and arranged to receive light from the illumination portion and output a first periodic spatially modulated light pattern corresponding to the first scale track pattern along a first light path, and a signal processing electronics comprising a first detector portion and a valid signal selection portion. The first detector portion is configured to receive the first periodic spatially modulated light pattern along the first light path, and to spatially filter the received first periodic spatially modulated light pattern and output signals that depend on the relative position. The first detector portion comprises a first set of at least three respective sub-portions, the at least three respective sub-portions producing a first set of signals comprising at least three respective sub-portion signal subsets that have nominally the same position-indicating signal characteristics when the first scale track is not contaminated or defective. The signal processing electronics is configured to input the first set of signals to the valid signal selection portion, analyze the first set of signals and identify a least-similar sub-portion signal subset that has a signal characteristic value that is least similar to comparable signal characteristic values associated with other more-similar sub-portion signal subsets of the first set of signals, and perform operations to determine a first scale track position-indicating signal based on a set of valid signals including a plurality of the more-similar sub-portion signal subsets of the first set of signals, and not based on the least-similar sub-portion signal subsets if the signal characteristic value of the least-similar sub-portion signal subsets is significantly different than the comparable signal characteristic values associated with the other more-similar sub-portion signal subsets.

In some embodiments, the signal processing electronics is configured to determine that the signal characteristic value of the least-similar sub-portion signal subset is significantly different than the comparable signal characteristic values of the more-similar sub-portion signal subsets when the signal characteristic value of the least-similar sub-portion signal subset falls outside of an allowed difference range defined based on at least one of the signal characteristic values associated with the more-similar sub-portion signal subsets. In some embodiments, the allowed difference range may be defined to coincide with the range of the signal characteristic values associated with the more-similar sub-portion signal subsets.

In some embodiments, the signal processing electronics may be configured to define the allowed difference range such that it is larger than the range of the signal characteristic values associated with the more-similar sub-portion signal subsets, and to determine that the signal characteristic value of the least-similar sub-portion signal subset is not significantly different than the comparable signal characteristic values of the more-similar sub-portion signal subsets when the signal characteristic value of the least-similar sub-portion signal subset does not fall outside of the allowed difference range. The signal processing electronics may then perform operations to determine the first scale track position-indicating signal based on a plurality of the more-similar sub-portion signal subsets and based on the least-similar sub-portion signal subset, if the signal characteristic value of the least-similar sub-portion signal subset is not significantly different than the comparable signal characteristic values associated with other more-similar sub-portion signal subsets.

In some embodiments, a lower limit of the allowed difference range may be a first defined difference amount less than one of the lowest of the signal characteristic values associated with the more-similar sub-portion signal subsets, an average of at least two signal characteristic values associated with the more-similar sub-portion signal subsets, or the highest of the signal characteristic values associated with the more-similar sub-portion signal subsets. In some embodiments, the first defined difference amount may be proportional to either the lowest of the signal characteristic values associated with the more-similar sub-portion signal subsets, an average of at least two signal characteristic values associated with the more-similar sub-portion signal subsets, the highest of the signal characteristic values associated with the more-similar sub-portion signal subsets, a difference between two signal characteristic values associated with the more-similar sub-portion signal subsets, or a measure of distribution associated with the more-similar sub-portion signal subsets. In one embodiment, the measure of distribution associated with the more-similar sub-portion signal subsets may be a standard deviation.

In some embodiments, an upper limit of the allowed difference range may be a second defined difference amount more than one of the lowest of the signal characteristic values associated with the more-similar sub-portion signal subsets, an average of at least two signal characteristic values associated with the more-similar sub-portion signal subsets, or the highest of the signal characteristic values associated with the more-similar sub-portion signal subsets. In some embodiments, the second defined difference amount may be proportional to one of the lowest of the signal characteristic values associated with the more-similar sub-portion signal subsets, an average of at least two signal characteristic values associated with the more-similar sub-portion signal subsets, the highest of the signal characteristic values associated with the more-similar sub-portion signal subsets, a difference between two signal characteristic values associated with the more-similar sub-portion signal subsets, or a measure of distribution associated with the more-similar sub-portion signal subsets.

In various embodiments, the first set of at least three respective sub-portions each comprise a first similar detector element set and are positioned apart from one another by an integer number of spatial periods of the first spatially modulated light pattern along the measuring axis direction. The first set of at least three respective sub-portions and/or the first similar detector element set may be organized differently in different embodiments. In one embodiment, the similar detector element set may comprise one of a single detector element, a set of non-adjacent detector elements having the same spatial phase, a set of non-adjacent detector elements including a plurality of spatial phases, and a set of adjacent detector elements including a plurality of spatial phases. In one embodiment, the set of adjacent detector elements including a plurality of spatial phases may be evenly spaced over an integer number of spatial periods of the first spatially modulated light pattern.

In some embodiments, the analyzer portion comprises at least one signal combiner, the similar detector element set comprises a set detector elements having a plurality of spatial phases, and each respective sub-portion signal subset is input to a signal combiner which outputs a respective combined signal that provides the signal characteristic value that corresponds to that respective sub-portion signal subset. In various embodiments, the signal combiner may output a signal that is a sum of a plurality of its input signals, a difference of a plurality of its input signals, a quotient based on a combination of its input signals, or more generally any desired signal that may be derived from a combination of its input signals.

In other embodiments, the similar detector element set of the first set of at least three respective sub-portions may comprise one of a single detector element having a first spatial phase, and a set of non-adjacent detector elements each having the first spatial phase. The detector portion may further comprise at least a second and third set of at least three respective sub-portions analogous to the first set of at least three respective sub-portions, which respectively produce second and thirds sets of signals analogous to the first set of signals, only having second and third spatial phases, respectively. The signal processing electronics may be configured to input the second set of signals to the valid signal selection portion and input the third set of signals to the valid signal selection portion, analyze the second set of signals and identify a least-similar sub-portion signal subset that has a signal characteristic value that is least similar to comparable signal characteristic values associated with other more-similar sub-portion signal subsets of the second set of signals, analyze the third set of signals and identify a least-similar sub-portion signal subset that has a signal characteristic value that is least similar to comparable signal characteristic values associated with other more-similar sub-portion signal subsets of the third set of signals, and perform operations to determine a first scale track position-indicating signal based on a set of valid signals including the plurality of the more-similar sub-portion signal subsets of the first set of signals, a plurality of the more-similar sub-portion signal subsets of the second set of signals and a plurality of the more-similar sub-portion signal subsets of the third set of signals, and not based on the least-similar sub-portion signal subset of the first set of signals if its signal characteristic value is significantly different than the comparable signal characteristic values associated with the other more-similar sub-portion signal subsets of the first set of signals, not based on the least-similar sub-portion signal subset of the second set of signals if its signal characteristic value is significantly different than the comparable signal characteristic values associated with the other more-similar signals of the second set of signals, and not based on the least-similar sub-portion signal subset of the third set of signals if its signal characteristic value is significantly different than the comparable signal characteristic values associated with the other more-similar signals of the third set of signals.

In some embodiments, the systems and methods disclosed herein may provide accurate real time measurements despite contamination or defect sizes on the order of a wavelength of a scale track pattern, or larger if a detector sub-portion receives light corresponding to more than one wavelength of a scale track pattern.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
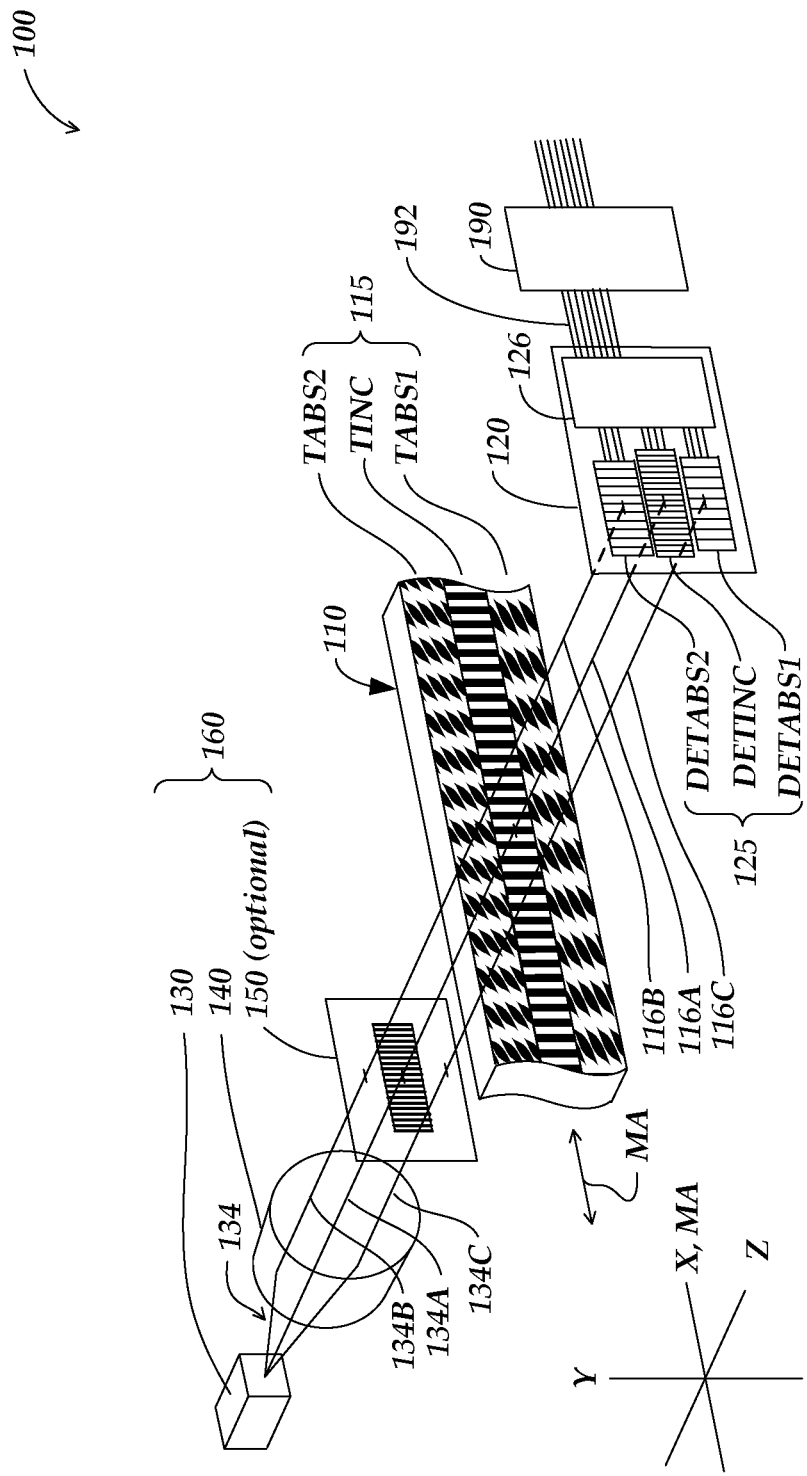
FIG. 1 is an exploded diagram of one embodiment of an optical encoder configuration that can employ the systems and methods disclosed herein.

FIG. 1 is an exploded diagram schematically illustrating one embodiment of an optical encoder configuration 100 that can employ the detector configurations and signal processing systems and methods disclosed herein. As shown in FIG. 1, the encoder configuration 100 includes a scale element 110, signal processing electronics 120 which is connected to signal generating and processing circuitry 190 by power and signal connections 192, and an illumination system or portion 160 comprising a light source 130 for emitting visible or invisible wavelengths of light, a lens 140, and an optional source grating 150. The light source 130 may also be connected to the signal generating and processing circuitry 190 by power and signal connections (not shown). In the example shown in FIG. 1, the scale element 110 includes an absolute scale pattern 115 including three scale track patterns: an incremental track pattern TINC, a first absolute track pattern TABS1, and a second absolute track pattern TABS2. The track patterns TABS1 and TABS2 are referred to as absolute scale track patterns because they provide signals (e.g., a combination of signals) usable to determine an absolute position over an absolute measuring range determined by their configuration. FIG. 1 also shows orthogonal X, Y and Z directions, according to a convention used herein. The X and Y directions are parallel to the plane of the absolute scale pattern 115, with the X direction parallel to the intended measuring axis direction MA (e.g., perpendicular to elongated grating pattern elements that may be included in the incremental track pattern TINC). The Z direction is normal to the plane of the absolute scale pattern 115.

The signal processing electronics 120 includes a detector configuration 125 comprising three detector tracks or portions DETINC, DET1 and DET2 arranged to receive light from the three scale track patterns TINC, TABS1 and TABS2, respectively. The signal processing electronics 120 may also include an analyzer portion 126 (e.g., signal adjusting, amplifying and/or combining circuits, and/or comparing circuits, etc.). In one embodiment, the signal processing electronics 120 may be fabricated as a single CMOS IC. As described in greater detail below, the detector configurations and signal processing systems and methods disclosed herein may be adapted for use with any or all of the three detector tracks or portions DETINC, DET1 and DET2 that receive light from the three scale track patterns TINC, TABS1 and TAB S2.

In operation, light 134 emitted from the light source 130 may be partially or fully collimated by the lens 140, over a beam area sufficient to illuminate the three scale track patterns. FIG. 1 schematically shows three light paths 134A, 1324B and 134C, of the light 134. Light path 134A is a representative central path including light that illuminates the scale track pattern TINC. When the scale track pattern TINC is illuminated, it outputs a periodic spatially modulated light pattern corresponding to the scale track pattern TINC (e.g., interference fringe light from diffracted orders, in some embodiments) along a light path 116A to the detector portion DETINC of the signal processing electronics 120. Light paths 134B and 134C are representative paths including light that illuminates the scale track patterns TABS2 and TABS1, respectively. When the scale track patterns TABS2 and TABS1 are illuminated, they output periodic spatially modulated light patterns (e.g., patterned light corresponding to their patterns) along light path 116B and 116C to the detector portions DETABS2 and DETABS1, respectively, of the signal processing electronics 120. In various embodiments, the encoder configuration 100 may be configured such the track patterns TAB S2 and TABS1 produce a shadow image (e.g., a blurred or unblurred shadow image) projected onto the detector portions DETABS2 and DETABS1, respectively. It will be appreciated that all spatially modulated light patterns move in tandem with the scale 110. In each of the detector portions DETINC, DET1 and DET2 individual photodetector areas are arranged to spatially filter their respective received spatially modulated light pattern to provide desirable position indicating signals (e.g., quadrature signals, or other periodic signals having a spatial phase relationship that is conducive to signal interpolation). In addition, one or more of the detector portions DETINC, DET1 and DET2 may be configured according to the principles described below with reference to FIGS. 3 and/or 4, and their signals may be processed according to the principles disclosed herein, in order to reduce the influence from the effects of scale track defects and contaminants. In some embodiments, rather than individual photodetector areas, a spatial filter mask with individual apertures may mask relatively larger photodetectors to provide light receiving areas analogous to the individual photodetector areas illustrated, to provide a similar overall signal effect according to known techniques.

In some moderate resolution embodiments (e.g., with fine track wavelengths on the order of 40 microns, or more), the encoder configuration 100 may be configured such that the track pattern TINC produces a shadow image projected onto the detector track DETINC. In relatively higher resolution embodiments, the track pattern TINC is generally configured to produce diffracted light. In some embodiments, for example, those having a fine track wavelength of approximately 8 microns or less, the encoder configuration 100 may be configured according to known methods such that diffracted orders (e.g., +/1 first orders) produce interference fringes that reach the detector track DETINC, according to known methods. In such embodiments, the source grating 150 is generally omitted. In other embodiments, for example, those having a fine track wavelength of approximately 8-40 microns, the encoder configuration 100 may be configured according to known methods such that several diffracted orders interact to produce a self image (e.g., a Talbot image or a Fresnel image) at the plane of the detector track DETINC. In self-imaging configurations the light source 130 may be an LED. The source grating 150 may be omitted, or optional, in some embodiments where the light source dimensions are small enough. However, when using an extended source, the source grating 150 may be needed in order to provide the most desirable self-imaging. In such a case, the light surrounding the representative light path 134A passes through the grating structure of the source grating 150 to provide an array of partially coherent illumination sources at the grating openings, which are arranged with a pitch approximately matching the pitch or wavelength of the track pattern TINC, to illuminate the scale track pattern TINC according to known self-imaging illumination principles. FIG. 1 shows an embodiment of the source grating 150 that allows the representative light paths 134B and 134C to pass through a transparent substrate of the source grating 150, so that their intensity and degree of collimation, which contributes to the quality of the signals from the detector tracks DETABS1 and DETABS2, is not disrupted by the grating structure of the source grating 150. In other embodiments, the representative light paths 134B and 134C may also pass through a grating structure on the source grating 150; however, this is not an optimum configuration.

In various applications, the signal processing electronics 120 and illumination system 160 are mounted in a fixed relationship relative to one another, e.g., in a readhead or gauge housing (not shown), and are guided along the measuring axis relative to the scale 110 by a bearing system, according to known techniques. The scale may be attached to a moving stage, or a gauge spindle, or the like, in various applications. The configuration shown in FIG. 1 is a transmissive configuration. The scale pattern 115 comprises light-blocking portions and light-transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the illumination system 160 and the signal processing electronics 120 are arranged on the same side of the scale 110, and positioned for angled illumination and reflection, if necessary, according to known techniques. The optical encoder configuration 100 may be further understood by reference to similar embodiments disclosed in U.S. Pat. No. 7,608,813, which is hereby incorporated herein by reference in its entirety.

It will be appreciated that for the purposes of this disclosure, the sequence and arrangement of the scale and detector tracks along the Y axis direction in FIG. 1, which provides an absolute encoder configuration, is exemplary only, and not limiting. For example, in other embodiments, the track patterns TABS1 and TABS2 may be arranged adjacent to one another with the fine track pattern TINC located to one side of them, or, in order to provide an incremental type encoder configuration, one or more of the scale and detector tracks may be omitted, and a remaining scale and detector track may still provide position indicating signals that have utility in certain applications.

Figure 2:
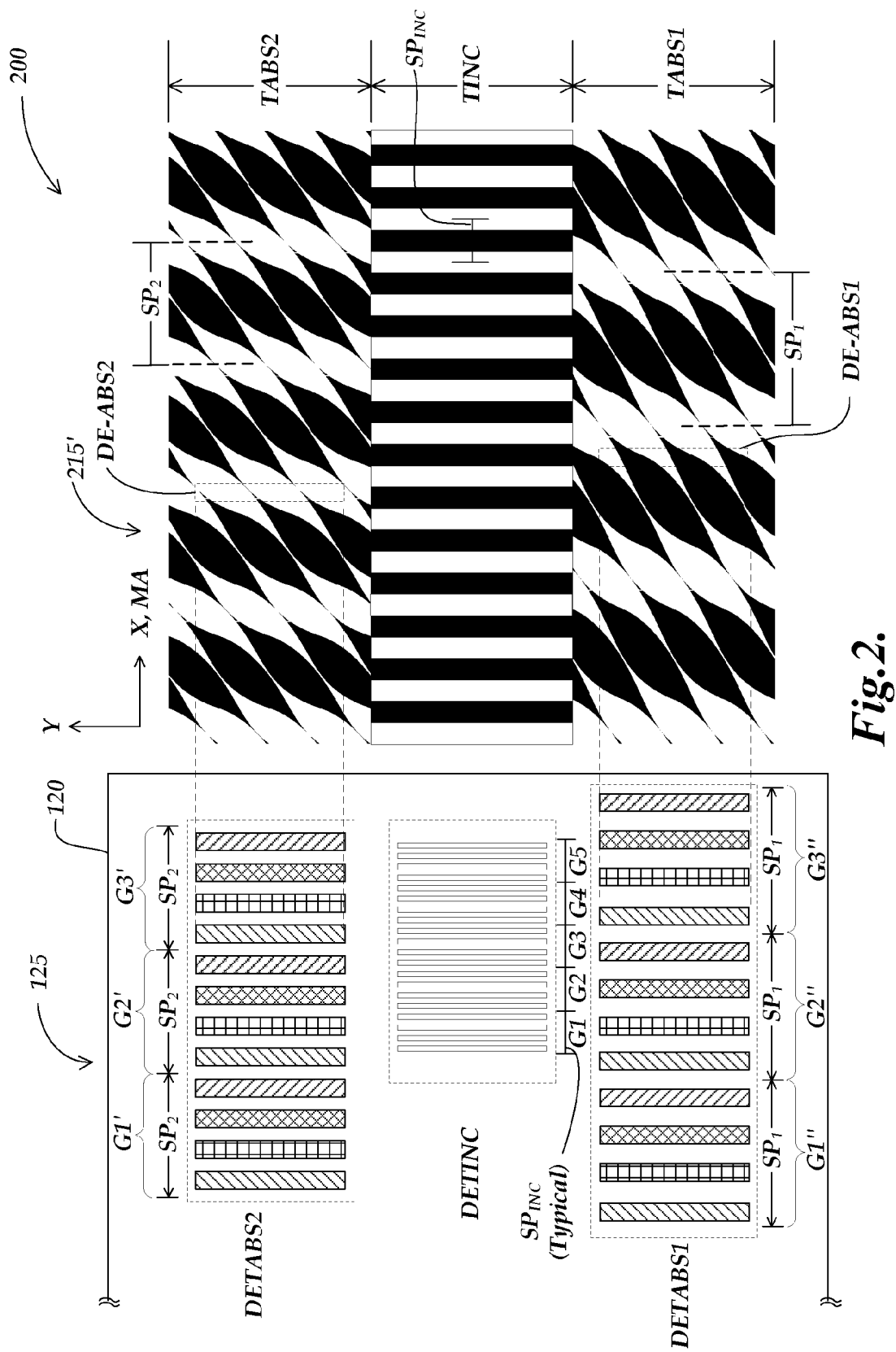
FIG. 2 is a diagram of various geometric relationships in a detector and periodic spatially modulated light pattern configuration such as that which may be produced in the optical encoder configuration of FIG. 1.

FIG. 2 is a diagram 200 of various geometric relationships and alignment in a detector and periodic spatially modulated light pattern configuration such as that which may be produced in the optical encoder configuration 100 of FIG. 1. In particular, FIG. 2 shows a representative segment of periodic spatially modulated light patterns 215' (e.g., such as may be produced along the light paths 116A-116C by the absolute scale pattern 115 shown in FIG. 1), which may be present at the detector portions 125' (e.g., the detector portions 125 shown in FIG. 1). Briefly, the periodic spatially modulated light patterns 215' include first and second periodic light patterns corresponding to the medium scale track patterns TABS1 and TAB S2, respectively, and a third periodic light pattern corresponding to the scale track pattern TINC. The spatially modulated light patterns corresponding to the scale tracks TINC, TABS1 and TAB2 is nominally aligned to be centered over the corresponding detector portions DETINC, DETABS1 and DETABS2, respectively (e.g., based on an overall encoder configuration such as that described with reference to FIG. 1). For reference, outlines representing individual detector elements DE-ABS1 and DE-ABS2 of the detector portions DETABS1 and DETABS2, respectively, are illustrated in a position corresponding to a nominal operational alignment.

As shown in FIG. 2, each of the periodic spatially modulated light patterns has a characteristic spatial period or spatial wavelength SP"x". In particular, the spatially modulated light pattern aligned with and corresponding to the track TAB S2 and the detector portion DETABS2 has a spatial period SP2. Similarly, the spatially modulated light pattern aligned with and corresponding to the track TABS1 and the detector portion DETABS1 has a spatial period SP1, and the spatially modulated light pattern aligned with and corresponding to the track TINC1 and the detector portion DETINC has a spatial period $SP_{INC}$. It will be appreciated that if these spatially modulated light patterns arise from collimated illumination as previously outlined with reference to the embodiment shown in FIG. 1, then their spatial periods may be the same as the spatial wavelengths of their corresponding scale track patterns. However, in other embodiments, diverging or converging illumination, or the use of a magnifying lens system (not shown) or the like, may cause the spatial periods of the spatially modulated light patterns to be different than the wavelengths of their corresponding scale track patterns. In any case, each of the detector portions DETINC, DETABS1 and DETABS2 may have a configuration where a group (e.g., G1, G1', or G1") of similarly connected detector elements repeats with the same spatial period, $SP_{INC}$, SP1, and SP2, respectively, as the spatially modulated light pattern that they are arranged to detect, as shown in FIG. 2. In particular, FIG. 2 shows that each of the detector portions DETINC, DETABS1 and DETABS2 have a configuration where a repeated group of four detector elements is evenly distributed throughout each corresponding spatial period $SP_{INC}$, SP1, and SP2, respectively. This arrangement of detector elements comprises a known quadrature-type detector element layout that allows the detector elements to be connected to provide known quadrature-type signals (e.g., as shown below in FIGS. 3 and/or 4). Briefly, in each spatial period, a group of four adjacent detector elements are evenly spaced to provide spatial filtering that detects four spatial phases (i.e., 0, 90, 180, 270 degrees) of the spatially modulated light pattern that they receive. In various embodiments disclosed herein, a plurality of groups (e.g., three groups) of four such adjacent detector elements may be provided. Patterned signal varying elements of each of the track patterns TAB S1 and TABS2 are configured such that when the areas of their spatially modulated light patterns are integrated over detector window areas DE-ABS1 and/or DE-ABS2 (corresponding to the individual detector elements of the detector portions DETABS1 and DETABS2, respectively), their integrated area (which is nominally the same as their integrated light signal) varies as a sinusoidal function of x. Thus, sinusoidal quadrature signals may be provided by each detector element as a function of position, as each spatially modulated light pattern moves over its corresponding detector portion. The quadrature signals may be processed as position indicating signals to determine the spatial phase position of each track within a local wavelength, according to known techniques. These determined spatial phase positions may be processed according to the known techniques, in order to determine an incremental and/or absolute position indicating signal. In some embodiments, the overall widths of the tracks TINC, TABS1 and TAB2 may be approximately 3.0 millimeters or less. The spatial period SP2 may be approximately 720 microns, the spatial period SP1 may be approximately 700 microns, and the spatial period $SP_{INC}$ may be approximately 20 microns.

Of course the, configuration and dimensions outlined in the example above are exemplary only, and not limiting. For example, in some embodiments, a three-phase detector configuration (as opposed to a quadrature detector configuration) may be used, wherein a repeated group of three detector elements is evenly distributed throughout each corresponding spatial period $SP_{INC}$, SP1, and SP2, respectively. Furthermore, as outlined previously, and described in greater detail below, the detector configurations and signal processing systems and methods disclosed herein may be adapted for use with any or all of the three detector portions DETINC, DET1 and DET2 that receive light from the three scale track patterns TINC, TAB S1 and TABS2. Alternatively, in order to provide an incremental type encoder configuration, one or more of the scale tracks and detector portions may be omitted and a remaining scale track and detector portion may still provide position indicating signals that have utility in certain applications.

Figure 3:
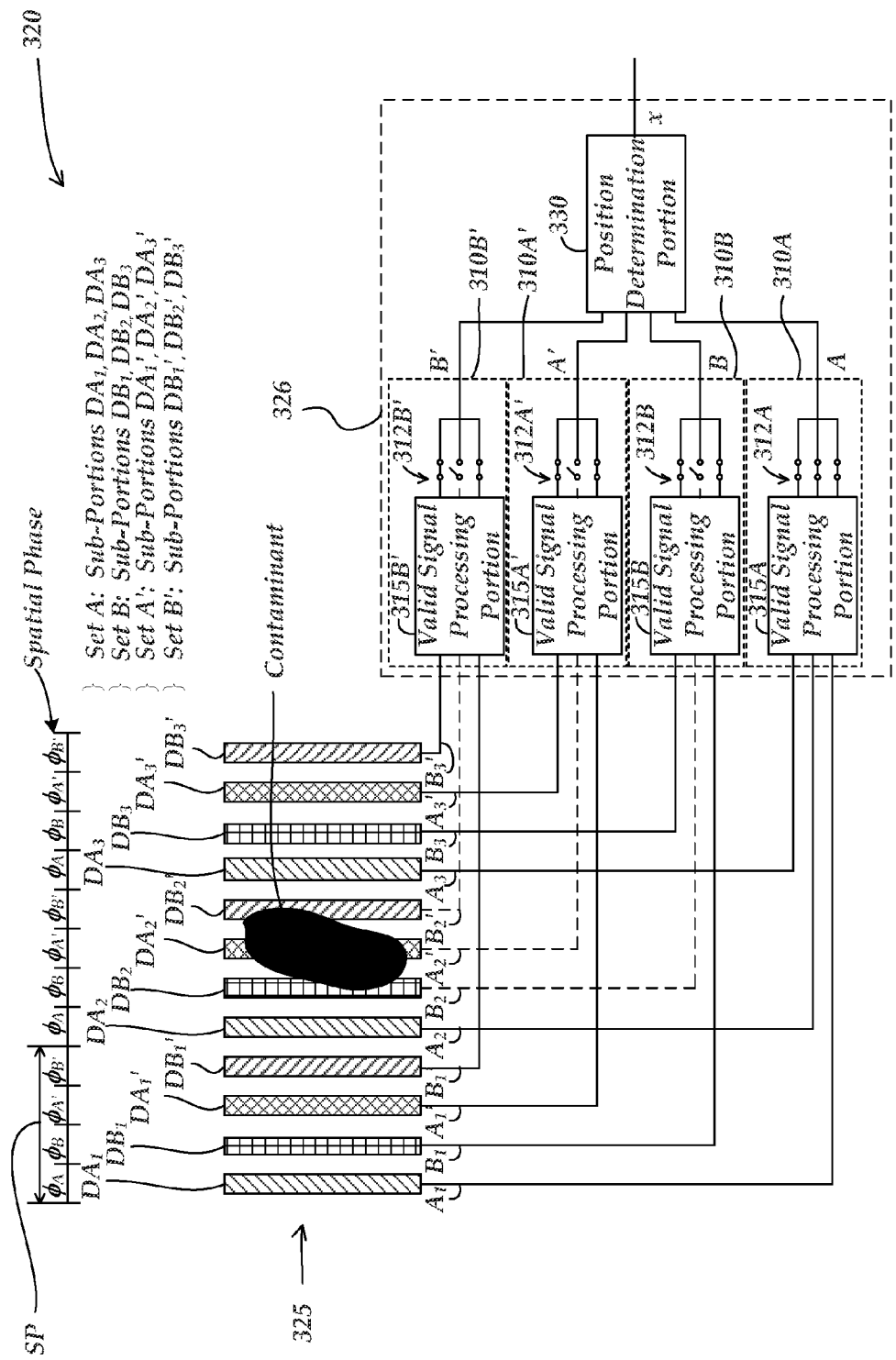
FIG. 3 is a diagram of a first embodiment of a signal processing electronics, illustrating certain design principles in accordance with some embodiments of the invention.

FIG. 3 is a diagram of a first embodiment of a signal processing electronics 320, illustrating certain design principles in accordance with the some embodiments of the invention. As shown in FIG. 3, the signal processing electronics 320 comprises a detector portion 325 and an analyzer portion 326. The detector portion 325 has a configuration similar to that outlined above with reference FIG. 2, where a repeated group of four detector elements is evenly distributed throughout each corresponding spatial period SP. In particular, the detector portion 325 comprises a first group of detector elements $DA_1$, $DB_1$, $DA_1'$, $DB_1'$, a second group of detector elements $DA_2$, $DB_2$, $DA_2'$, $DB_2'$, and a third group of detector elements $DA_3$, $DB_3$, $DA_3'$ and $DB_3'$. It will be appreciated that each of the detector elements $DA_1$, $DA_2$, and $DA_3$ provide signals having the same spatial phase, each of the detector elements $DB_1$, $DB_2$, and $DB_3$ provide signals having the same spatial phase, each of the detector elements $DA_1'$, $DA_2'$, and $DA_3'$ provide signals having the same spatial phase, and each of the detector elements $DB_1'$, $DB_2'$, and $DB_3'$ provide signals having the same spatial phase. The detector portion 325 is configured to receive a periodic spatially modulated light pattern along a light path as previously outlined with reference to FIG. 2, and to spatially filter the received first periodic spatially modulated light pattern and output respective signals $A_1$, $B_1$, $A_1'$, $B_1'$, $A_2$, $B_2$, $A_2'$, $B_2'$, $A_3$, $B_3$, $A_3'$ and $B_3'$. The detector portion 325 and the analyzer portion 326 provide one generic embodiment that may be used for any or each of the detector portions DETINC, DETABS1 and DETABS2 outlined above, for example.

In the embodiment shown in FIG. 3, the detector elements are connected to the analyzer portion 326 to provide four sets of sub-portions that each includes three sub-portions of the detector portion 325. Within each set, together, the three sub-portions produce a set of signals comprising three respective sub-portion signal subsets (in this case, each subset consists of a single signal) that have nominally the same signal characteristics when a track pattern is not contaminated or defective. For example, a first set A of sub-portions includes the sub-portions $DA_1$, $DA_2$, and $DA_3$, each of which provides a signal having nominally the same magnitude and spatial phase, in this embodiment. We may describe each of the three sub-portions as comprising a similar detector element set that output similar sub-portion signal subsets. In this embodiment, each similar detector element set consists of a single detector element (e.g., $DA_1$, $DA_2$, or $DA_3$), and each similar detector element set is positioned apart by an integer number of the spatial period SP (a single spatial period in this case) of the detected spatially modulated light pattern along the measuring axis direction. With such an arrangement, within each set of sub-portions, each of the three sub-portions produce respective sub-portion signal subsets (e.g., individual signals from individual detector elements) that have nominally the same signal characteristics when a corresponding scale track pattern is not contaminated or defective.

A second set B of three sub-portions that each comprise a similar detector element set includes detector elements $DB_1$, $DB_2$, and $DB_3$, a third set A' of sub-portions that each comprise a similar detector element set includes detector elements $DA_1'$, $DA_2'$, and $DA_3'$, and a fourth set of sub-portions B' that each comprise a similar detector element set includes detector elements $DB_1'$, $DB_2'$, and $DB_3'$. In this embodiment, each of the second, third and fourth set of three sub-portions is analogous to the first set of three sub-portions, and may be similarly understood. In this embodiment, within each of the sets of sub-portions, each of the three respective sub-portions produce respective sub-portion signal subsets that have nominally the same signal characteristics when a corresponding scale track pattern is not contaminated or defective (e.g., each of the sub-portion signal subsets consisting of an individual signal from an individual detector element that has nominally the same respective spatial phase).

The analyzer portion 326 comprises a valid signal selection portion 310 which comprises respective valid signal selection portions 310A, 310B, 310A' and 310B'. In this embodiment, the valid signal selection portion 310A is configured to input the three respective sub-portion signal subsets (each subset an individual detector element signal in this embodiment) provided by the set A of sub-portions. The valid signal selection portion 310B is configured to input the three respective sub-portion signal subsets provided by the set B of sub-portions. The valid signal selection portion 310A' is configured to input the three respective sub-portion signal subsets provided by the set A' of sub-portions, and the valid signal selection portion 310B' is configured to input the three respective sub-portion signal subsets provided by the set B' of sub-portions. The analyzer portion 326 also comprises a position determination portion 330 configured to input sub-portion signal subsets determined to be valid by the valid signal selection portions 310A, 310B, 310A' and 310B'. The valid signal selection portions 310A, 310B, 310A' and 310B' each comprise valid signal processing portions 315A, 315B, 315A' and 315B' which control valid signal selection means 312A, 312B, 312A' and 312B' (which are schematically represented as switches in FIG. 3), respectively. It should be appreciated that in some embodiments, the valid signal processing portions and their respective valid signal selection means may be merged and indistinguishable from one another within the valid signal selection portions. Circuits and/or routines suitable for identifying a valid set of signals (e.g., sufficiently similar sub-portion signal subsets) within the valid signal selection portions may be configured according to known methods, and any signal processing scheme for providing valid signals (e.g., sufficiently similar sub-portion signal subsets) according to the various principles disclosed herein is within the scope of the invention.

In operation, the analyzer portion 326 inputs a first set of sub-portion signal subsets (e.g., each subset an individual detector element signal in this embodiment) from the first set A of sub-portions to valid signal selection portion 310A, a second set B of sub-portion signal subsets from the second set of sub-portions to valid signal selection portion 310B, a third set of sub-portion signal subsets from the third set A' of sub-portions to valid signal selection portion 310A', and a fourth set of sub-portion signal subsets from the fourth set B' of sub-portions to valid signal selection portion 310B'. In various embodiments, the valid signal processing portions 315A, 315B, 315A' and 315B' each identify a plurality of more-similar sub-portion signal subsets of each respective first through fourth set of signals, and a least-similar sub-portion signal subset that has a signal characteristic value that is least similar to comparable signal characteristic values associated with other more-similar sub-portion signal subsets of each respective set. For example, in one embodiment, each valid signal processing portion may comprise difference circuits and/or comparator circuits that may output signals that allow the more-similar sub-portion signal subsets (e.g., the most similar signals) to be identified, as well as the least similar sub-portion signal subsets (e.g., that signal that has the greatest difference compared to each of the other signals), according to known methods. Each valid signal processing portion 315A, 315B, 315A' and 315B' further operates to identify a set of valid signals according to principles now described. In particular, each respective valid signal processing portion operates to identify a set of valid signals that includes a plurality of more-similar sub-portion signal subsets of its associated set of three respective sub-portion signal subsets, and not including the least-similar sub-portion signal subset if the signal characteristic value corresponding to the least-similar sub-portion signal subset is significantly different than the comparable signal characteristic values associated with the other more-similar sub-portion signal subsets. Thus, in the embodiment shown in FIG. 3, each valid signal processing portion 315A, 315B, 315A' and 315B' outputs at least a plurality of the more-similar sub-portion signal subsets (in some embodiments, all of the more-similar signals) to the position determination portion 330 (e.g., through the respective valid signal selection means or switches 312A, 312B, 312A' and 312B'), such that a position-indicating signal may be based on at least the plurality of the more-similar sub-portion signal subsets, and if the signal characteristic value of the least-similar sub-portion signal subsets of a respective set is significantly different than the comparable signal characteristic values associated with the other more-similar sub-portion signal subsets of that set, then the valid signal processing portion does not include that sub-portion signal subset in the output to the position determination portion 330 (e.g., by opening a valid signal selection means or switch that isolates or disconnects the least-similar sub-portion signal subset), such that the position-indicating signal is not based on a least-similar sub-portion signal subset which is significantly different than the comparable signal characteristic values associated with the other more-similar sub-portion signal subsets of that set of signals.

In the example shown in FIG. 3, a contaminant on a scale track is proximate to detector elements $DB_2$, $DA_2'$ and $DB_2'$. As a result, signals $B_2$, $A_2'$ and $B_2'$ are altered by the contaminant (as indicated by dashed lines) and therefore have signal characteristic values which are significantly different than comparable signal characteristic values associated with the other more-similar signals from their respective sets of signals which are input by their respective valid signal selection portions. For example, as shown in FIG. 3, signals $B_1$ and $B_3$ are more similar to each other than to $B_2$ because only signal $B_2$ corresponds to a portion of a scale track with a contaminant, and therefore it has a signal characteristic value which is significantly different than that of signals $B_1$ and $B_3$. Therefore, the valid signal processing portion 315B is able to identify the signals $B_1$ and $B_3$ as more-similar signals, and signal $B_2$ as the least similar signal. In this example, the valid signal processing portions 315B then identifies that signal $B_2$ as significantly different than the more-similar signals, and does not include it in the signal output to the position determination portion 330, as schematically illustrated by the open switch corresponding to the signal $B_2$ in the block 312B. The valid signal processing portions 315N and 315B' similarly identify the signals $A_2'$ and $B_2'$ as significantly different than the more-similar signals in their respective sets, and do not include them in their signals output to the position determination portion 330, as schematically illustrated by the open switches corresponding to the signals $A_2'$ and $B_2'$ in the blocks 312A' and 312B'. In this example, the valid signal processing portion 315A does not identify any "A" signal as significantly different than the more-similar "A" signals, since there is no contamination affecting an A signal. Therefore, in this particular embodiment, all A signals are included in the signal output to the position determination portion 330, as schematically illustrated by all the switches being closed in the block 312A. However, it will be understood that this particular operation is exemplary only, and not limiting. Various alternative embodiments for determining significantly different least-similar signal characteristic values are outlined in greater detail below.

In one embodiment, the valid signal processing portions 315A, 315B, 315A' and 315B' and/or the position determination portion 330 may be configured to provide average signal values so as to provide quadrature signals A, B, A' and B' that have the proper amplitudes relative to one another, for example according to the equations:

$$A = \frac{1}{3}(A_1 + A_2 + A_3) \quad \text{(Eq. 1)}$$

$$B = \frac{1}{2}(B_1 + B_3) \quad \text{(Eq. 2)}$$

$$A' = \frac{1}{2}(A_1' + A_3') \quad \text{(Eq. 3)}$$

$$B' = \frac{1}{2}(B_1' + B_3') \quad \text{(Eq. 4)}$$

Alternatively, in one embodiment that may be advantageous in terms of speed of operation or simplicity, the signal processing electronics may be configured such that when one of the signals from one of the valid signal selection portions 310 is excluded from the output (e.g., one or more of the signals $B_2$, $A_2'$ and $B_2'$, in this example), then a comparable signal may be automatically excluded from the output of each of the other valid signal selection portions 310 even if it is not analyzed to be significantly different (e.g., the signal $A_2$ may be excluded), just so that the outputs from each of the valid signal selection portions 310 are based on the same number of valid signals and therefore have the proper signal amplitudes relative to one another.

In one embodiment, the position determination portion 330 inputs quadrature signals A, B, A' and B' and outputs a position signal x which depends on a relative position between the scale and detector along the measuring axis direction MA, according to known methods. In one embodiment, based on the quadrature signals A, B, A' and B', a spatial phase φ is determined according to the equation:

$$\Phi = \operatorname{atan}\left(\frac{A - A'}{B - B'}\right) \quad \text{(Eq. 5)}$$

and then a position x within a spatial wavelength is determined according to the equation:

$$x = \frac{\phi}{2\pi} L \quad \text{(Eq. 6)}$$

where L is wavelength associated with a scale pattern, and the phase φ is the spatial phase corresponding to that wavelength, according to EQUATION 5. Accumulated wavelengths may be counted during relative motion in an incremental type encoder, in order to determine an accumulated displacement.

In some embodiments, the signal processing electronics may be configured to determine that the signal characteristic value of the least-similar sub-portion signal subset is significantly different than the comparable signal characteristic values of the more-similar sub-portion signal subsets when the signal characteristic value of the least-similar sub-portion signal subset falls outside of an allowed difference range defined based on at least one of the signal characteristic values associated with the more-similar sub-portion signal subsets. In some embodiments, the allowed difference range may be defined to coincide with the range of the signal characteristic values associated with the more-similar sub-portion signal subsets. In such embodiments, the signal characteristic value of the least-similar sub-portion signal subset will always be judged to be significantly different than the comparable signal characteristic values associated with the other more-similar sub-portion signal subsets of that set, and that least-similar sub-portion signal subset will always be excluded from subsequent processing, such that the position-indicating signal will never be based on a least similar sub-portion signal subset. In other alternative embodiments, the allowed difference range may be defined such that it is larger than the range of the signal characteristic values associated with the more-similar sub-portion signal subsets. In such embodiments, the least-similar sub-portion signal subset may have a signal characteristic value which is higher or lower than each of the more-similar sub-portion signal subsets, yet within the allowed difference range. For example, in various embodiments, a lower limit of the allowed difference range may be a first defined difference amount less than either the lowest of the signal characteristic values associated with the more-similar sub-portion signal subsets, an average of at least two signal characteristic values associated with the more-similar sub-portion signal subsets, or the highest of the signal characteristic values associated with the more-similar sub-portion signal subsets.

In various embodiments, the first defined difference amount may be proportional to (e.g., a percentage of) either the lowest of the signal characteristic values associated with the more-similar sub-portion signal subsets, an average of at least two signal characteristic values associated with the more-similar sub-portion signal subsets, the highest of the signal characteristic values associated with the more-similar sub-portion signal subset, a difference between two signal characteristic values associated with the more-similar sub-portion signal subsets or a measure of distribution associated with the more-similar sub-portion signal subsets, for example. For example, as shown in FIG. 3, the first defined difference amount may be proportional to the signal characteristic value of the lower of signals B1 and B2, the average signal characteristic value of signals B1 and B2, the signal characteristic value of the higher of signals B1 and B2, a difference between signals B1 and B2 or a measure of distribution of signals B1 and B2. In some cases, the measure of distribution associated with the more-similar signals (e.g., B1 and B2) may be a standard deviation.

In various embodiments, an upper limit of the allowed difference range may be a second defined difference amount more than either the lowest of the signal characteristic values associated with the more-similar sub-portion signal subsets, an average of at least two signal characteristic values associated with the more-similar sub-portion signal subsets or the highest of the signal characteristic values associated with the more-similar sub-portion signal subsets. In various embodiments, the second defined difference amount may be proportional to either the lowest of the signal characteristic values associated with the more-similar sub-portion signal subsets, an average of at least two signal characteristic values associated with the more-similar sub-portion signal subsets, the highest of the signal characteristic values associated with the more-similar sub-portion signal subsets, a difference between two signal characteristic values associated with the more-similar sub-portion signal subsets or a measure of distribution associated with the more-similar sub-portion signal subsets. For example, as shown in FIG. 3, the second defined difference amount may be proportional to the signal characteristic value of the lower of signals B1 and B2, the average signal characteristic value of signals B1 and B2, the signal characteristic value of the higher of signals B1 and B2, a difference between signals B1 and B2 or a measure of distribution of signals B1 and B2.

Although the similar detector element sets illustrated in FIG. 3 consist of a single detector element, it should be appreciated that if a detector portion is longer, the three sub-portions in each set of sub-portions may also be longer. Thus, in some embodiments that are otherwise analogous to FIG. 3, each similar detector element set may be positioned apart from others by an integer number of the spatial period SP of the spatially modulated light pattern and each similar detector element set may comprise a plurality of non-adjacent detector elements having the same spatial phase.

Figure 4:
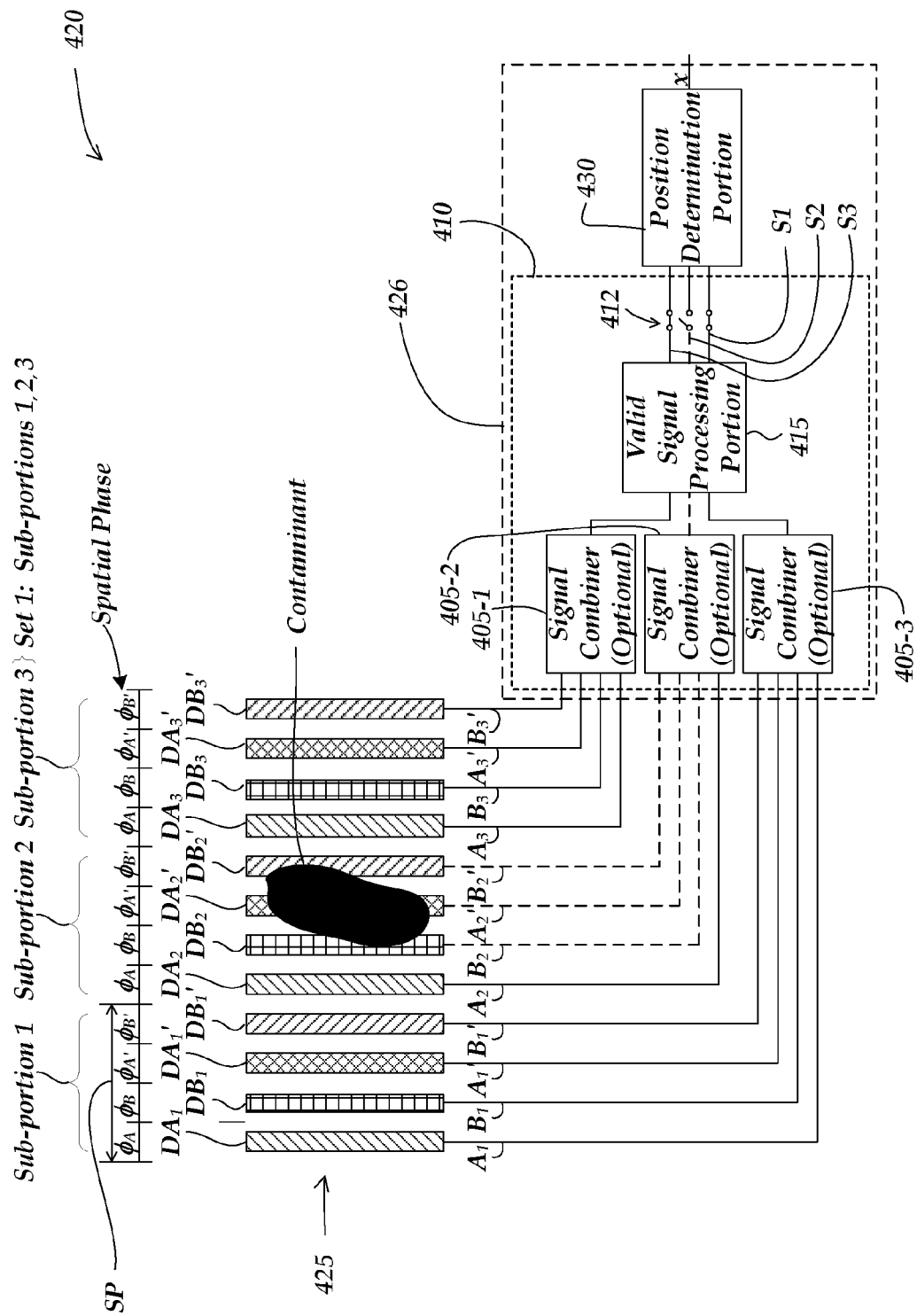
FIG. 4 is a diagram of a second embodiment of a signal processing electronics, illustrating certain design principles in accordance with some embodiments of the invention.

FIG. 4 is a diagram of a second embodiment of a signal processing electronics 420, illustrating certain design principles in accordance with some embodiments of the invention. As shown in FIG. 4, the signal processing electronics 420 comprises a detector portion 425 and an analyzer portion 426.

The detector portion 425 has a configuration similar to that outlined above with reference to FIG. 2, where a repeated group of four detector elements is evenly distributed throughout each corresponding spatial period SP. In particular, the detector portion 425 comprises a first group of detector elements $DA_1$, $DB_1$, $DA_1'$, $DB_1'$, a second group of detector elements $DA_2$, $DB_2$, $DA_2'$, $DB_2'$, and a third group of detector elements $DA_3$, $DB_3$, $DA_3'$ and $DB_3'$. It will be appreciated that each of the detector elements $DA_1$, $DA_2$, and $DA_3$ provide signals having the same spatial phase, each of the detector elements $DB_1$, $DB_2$, and $DB_3$ provide signals having the same spatial phase, and so on. The detector portion 425 is configured to receive a periodic spatially modulated light pattern along a light path as previously outlined with reference to FIG. 2, and to spatially filter the received periodic spatially modulated light pattern and output respective signals $A_1$, $B_1$, $A_1'$, $B_1'$, $A_2$, $B_2$, $A_2'$, $B_2'$, $A_3$, $B_3$, $A_3'$ and $B_3'$. The detector portion 425 and the analyzer portion 426 provide one generic embodiment that may be used for any or each of the detector portions DETINC, DETABS1 and DETABS2 outlined above, for example.

In the embodiment shown in FIG. 4, the detector elements are connected to the analyzer portion 426 to provide a single set of sub-portions that includes three sub-portions—Sub-portion 1, Sub-portion 2 and Sub-portion 3—of the detector portion 425. Together, the three sub-portions produce a set of signals comprising three respective sub-portion signal subsets (in this case, each subset consists of four signals having different spatial phases designated A, B, A' and B') that have nominally the same signal characteristics when a track pattern is not contaminated or defective. For example, all "A" signals are nominally the same in the subsets, all "B" signals are nominally the same in the subsets, and so on. We may describe each of the three sub-portions as comprising a similar detector element set. In this embodiment, each similar detector element set consists of four adjacent detector elements evenly spaced over the spatial period SP, and each similar detector element set is positioned apart from one another by an integer number of the spatial period SP (a single spatial period in this case) of the detected spatially modulated light pattern along the measuring axis direction. With such an arrangement, within each set of sub-portions each of the three sub-portions produce respective signals that have nominally the same position-indicating signal characteristics when a corresponding scale track pattern is not contaminated or defective. In the example shown, sub-portion 1 includes detector elements $DA_1$, $DB_1$, $DA_1'$ and $DB_1'$, sub-portion 2 includes detector elements $DA_2$, $DB_2$, $DA_2'$ and $DB_2'$, and sub-portion 3 includes detector elements $DA_3$, $DB_3$, $DA_3'$ and $DB_3'$.

The analyzer portion 426 comprises a valid signal selection portion 410 comprising a valid signal processing portion 415 and valid signal selection means 412 (schematically represented as switches in FIG. 4) which is controlled by the valid signal processing portion 415, and a position determination portion 430 configured to input signals from the valid signal selection portion 410 (as outlined previously and described in greater detail below). In the particular embodiment shown in FIG. 4, the valid signal selection portion 410 also comprises respective signal combiner portions 405-1, 405-2 and 405-3 which are configured to input the three respective sub-portion signal subsets (each subset having four adjacent detector element signals having different spatial phases in this embodiment) provided by Sub-portion 1, Sub-portion 2 and Sub-portion 3. The signal combiner portions 405-1, 405-2 and 405-3 may output comparable signals derived from a combination of their respective input signals, and the similarity of the signal characteristics of those comparable derived signals may be analyzed by the valid signal processing portion 415, which outputs signals for use by the position determination portion 430, according to previously described principles and as described in greater detail below. In various embodiments, each of the signal combiner portions 405-1, 405-2 and 405-3 may output a signal (or more than one signal) that is a sum of a plurality of its input signals, a difference of a plurality of its input signals, a quotient based on a combination of its input signals, or more generally any desired signal that may be derived from a combination of its input signals. In some embodiments, the signal combiner portions 405-1, 405-2 and 405-3 may output spatial phase or position signals (e.g., according to EQUATIONS 5 or 6). However, it should be appreciated that the signal combiner portions 405-1, 405-2 and 405-3 may be optional in various embodiments, in which case the valid signal processing portion 415 may be configured to input the three respective sub-portion signal subsets from Sub-portion 1, Sub-portion 2 and Sub-portion 3, and analyze the three respective sub-portion signal subsets in any manner that allows it to output a set of valid signals for use by the position determination portion 430, according to previously described principles and as described in greater detail below.

In operation, the valid signal selection portion 410 and the position determination portion 430 should be understood to fulfill functions substantially similar to that of the valid signal selection portion 310 and the position determination portion 330, previously outlined with reference to FIG. 3. In particular, in various embodiments, the valid signal processing portion 415 is configured to identify a plurality of more-similar sub-portion signal subsets of the set of three respective sub-portion signal subsets, for example, based on their corresponding more-similar signal characteristic values, and a least-similar sub-portion signal subset that has a corresponding signal characteristic value that is least similar to the comparable signal characteristic values associated with the other more-similar sub-portion signal subsets. For example, in one embodiment, the valid signal processing portion 415 may comprise difference circuits and/or comparator circuits that may output signals that allow more-similar signal characteristics corresponding to the more-similar sub-portion signal subsets to be identified, as well as allowing the least-similar signal characteristic corresponding to the least-similar sub-portion signal subset to be identified, according to known methods.

The valid signal processing portion 415 further operates to identify a set of valid signals according to previously outlined principles and as described further below. It will be appreciated that regardless of the particular signal characteristics that it analyzes (e.g., regardless of whether they are signal characteristics of the sub-portion signal subsets themselves, or signal characteristics of combination signals derived from the sub-portion signal subsets by signal combining circuits), according to the previous description, each signal characteristic that is analyzed by the valid signal processing portion 415 is traceable to a particular sub-portion signal subset. Therefore, operating to provide functions similar to those previously outlined with reference to FIG. 3, the valid signal processing portion 415 may be described as operating to identify a set of valid signals that includes a plurality of more-similar sub-portion signal subsets of the set of three respective sub-portion signal subsets, and not including the least-similar sub-portion signal subset if the signal characteristic value corresponding to the least-similar sub-portion signal subset is significantly different than the comparable signal characteristic values associated with the other more-similar sub-portion signal subsets. Various embodiments for determining whether or not the signal characteristic value of the least-similar sub-portion signal subset is significantly different than the comparable signal characteristic values associated with the other more-similar sub-portion signal subsets have been previously described with reference to FIG. 3, for example.

Then, in the embodiment shown in FIG. 4, the valid signal processing portion 415 controls the valid signal selection means or switches 412 to output signals to the position determination portion 430 that are based on the set of valid signals, such that a position-indicating signal may be based on at least a plurality of the more-similar sub-portion signal subsets, and if the signal characteristic value of the least-similar sub-portion signal subset is significantly different than the comparable signal characteristic values associated with the other more-similar sub-portion signal subsets, then the valid signal processing portion 415 does not include a signal corresponding to the least-similar sub-portion signal subset in the signals output to the position determination portion 430, such that the position-indicating signal is not based on a least-similar sub-portion signal subset which has a signal characteristic value that is significantly different than the comparable signal characteristic values associated with the other more-similar sub-portion signal subsets.

Provided that the signals output by the valid signal selection portion 410 for use by the position determination portion 430 are based on (e.g., derived from) such a set of valid signals, the signals output to the position determination portion 430 may take any convenient form usable by the position determination portion 430 to determine an appropriate position-indicating signal, in various embodiments. For example, the signals output to the position determination portion 430 may be identical to the set of valid signals, or sums or differences of appropriate members of the set of valid signals, or quotients based on a combination of appropriate members of the set of valid signals, or spatial phases or position signals based on appropriate members of the set of valid signals, in various embodiments. Thus, it will be appreciated that the potential output signals S1, S2, and S3 shown in FIG. 4 may each represent a single combined signal, or a desirable respective set of output signals (e.g., S1 may comprise the signals A1, B1, A1', B1').

It should be appreciated that in some embodiments, the valid signal selection means 412 and the valid signal processing portion 415 (and the signal combiner portions 405-1, 405-2 and 405-3, if present) may be merged and indistinguishable from one another within the valid signal selection portion 410. Circuits and/or routines suitable for identifying a valid set of signals (e.g., sufficiently similar sub-portion signal subsets) may be configured according to known methods, and any signal processing scheme for providing valid signals (e.g., sufficiently similar sub-portion signal subsets) according to the various principles disclosed herein is within the scope of the invention.

In the example shown in FIG. 4, a contaminant on a scale track is proximate to detector elements $DB_2$, $DA_2'$ and $DB_2'$. As a result, signals $B_2$, $A_2'$ and $B_2'$ are altered by the contaminant (as indicated by dashed lines) and therefore the corresponding sub-portion 2 signal subset will have a signal characteristic value or values which are significantly different than a comparable signal characteristic value or values associated with the other more-similar sub-portion signal subsets. For example, as shown in FIG. 4, the sub-portion 1 signal subset and the sub-portion 3 signal subset are more similar to each other than to the sub-portion 2 signal subset because only the sub-portion 2 signal subset corresponds to a portion of a scale track with a contaminant, and therefore it has a signal characteristic value or values which are significantly different than those corresponding to the sub-portion 1 and 3 signal subsets. Therefore, the valid signal processing portion 415 is able to identify the sub-portion 1 and 3 signal subsets as more-similar, and the sub-portion 2 signal subset as the least similar. In this example, the valid signal processing portions 415 then identifies that sub-portion 2 signal subset as significantly different than the more-similar sub-portion signal subsets, and does not include it in the signal output to the position determination portion 430, as schematically illustrated by the open switch corresponding to the signal S2 in the valid signal selection means 412.

It should be appreciated that other arrangements of sets of sub-portions of the detector portion which are not shown in FIG. 3 or 4 may be used in accordance with the principles disclosed herein, as will be appreciated by one of ordinary skill in the art based on this disclosure. For example, more generally, the similar detector element set may comprise a single detector element, a set of non-adjacent detector elements having the same spatial phase (as shown in FIG. 3), a set of non-adjacent detector elements including a plurality of spatial phases, or a set of adjacent detector elements including a plurality of spatial phases (as shown in FIG. 4).

It should be appreciated that the prior art '803 Application teaches that signals which have signal characteristics that deviate from a predetermined ideal range should be judged abnormal. Thus, contamination or defects that disrupt even a minor or moderate portion of a signal from a detector sub-portion may be judged abnormal, in order to prevent inaccurate measurement. However, under an unpredictable variety of operating conditions (e.g., weakened illumination), low signals are not necessarily inaccurate signals, so the methods of the '803 Application may needlessly disable encoder operation in some cases. Furthermore, the most reliable signal characteristics taught in the '803 Application require sampling signal data over time (e.g., at multiple positions) and deriving a signal characteristic from that data, so that a position-independent actual signal characteristic can be derived and compared to predetermined signal characteristic limits which must be established in a way that is valid for any position. In contrast, the systems and methods disclosed herein (e.g., the embodiments described with reference to FIGS. 3 and 4) rely on comparing the signal characteristics of a plurality of actual signals to one another (not to a predetermined ideal signal characteristic range), which allows reliable operation to continue under a wide variety of unpredictable operating conditions that affect all signals similarly without significantly degrading accuracy (e.g., low illumination levels, changing environmental conditions, or component aging). Furthermore, assuming similar spatial phases and signal processing, a plurality of simultaneously sampled actual signals should be nominally the same regardless of position. This means that abnormal signals due to contamination or scale defects can be reliably revealed by simple signal characteristics (e.g., signal magnitudes), obtainable with a single signal sample, regardless of position. Therefore, in various embodiments, the systems and methods disclosed herein may reject abnormal signals and provide accurate real-time measurements on the basis of simple signal characteristics and single signal samples. Furthermore, they may work effectively while tolerating contamination or defect sizes on the order of a wavelength of a scale track pattern, or larger if a detector sub-portion receives light corresponding to more than one wavelength of a scale track pattern.

Figure 5A:
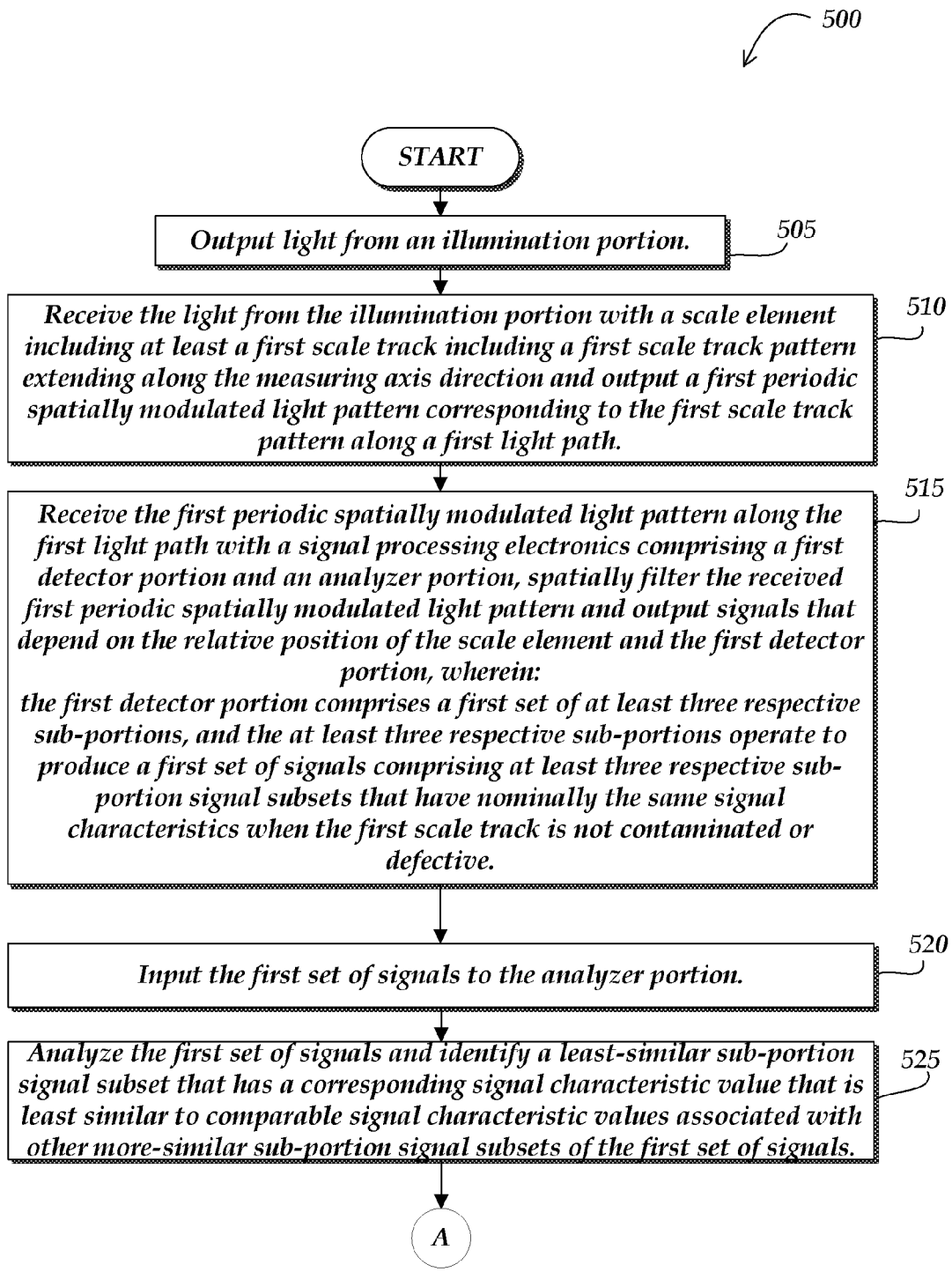
FIGS. 5A and 5B show a flow diagram illustrating a routine for detecting and processing signals in an optical encoder configuration with reduced influence from the effects of scale track defects and contaminants, in accordance with some embodiments of the invention.
Figure 5B:
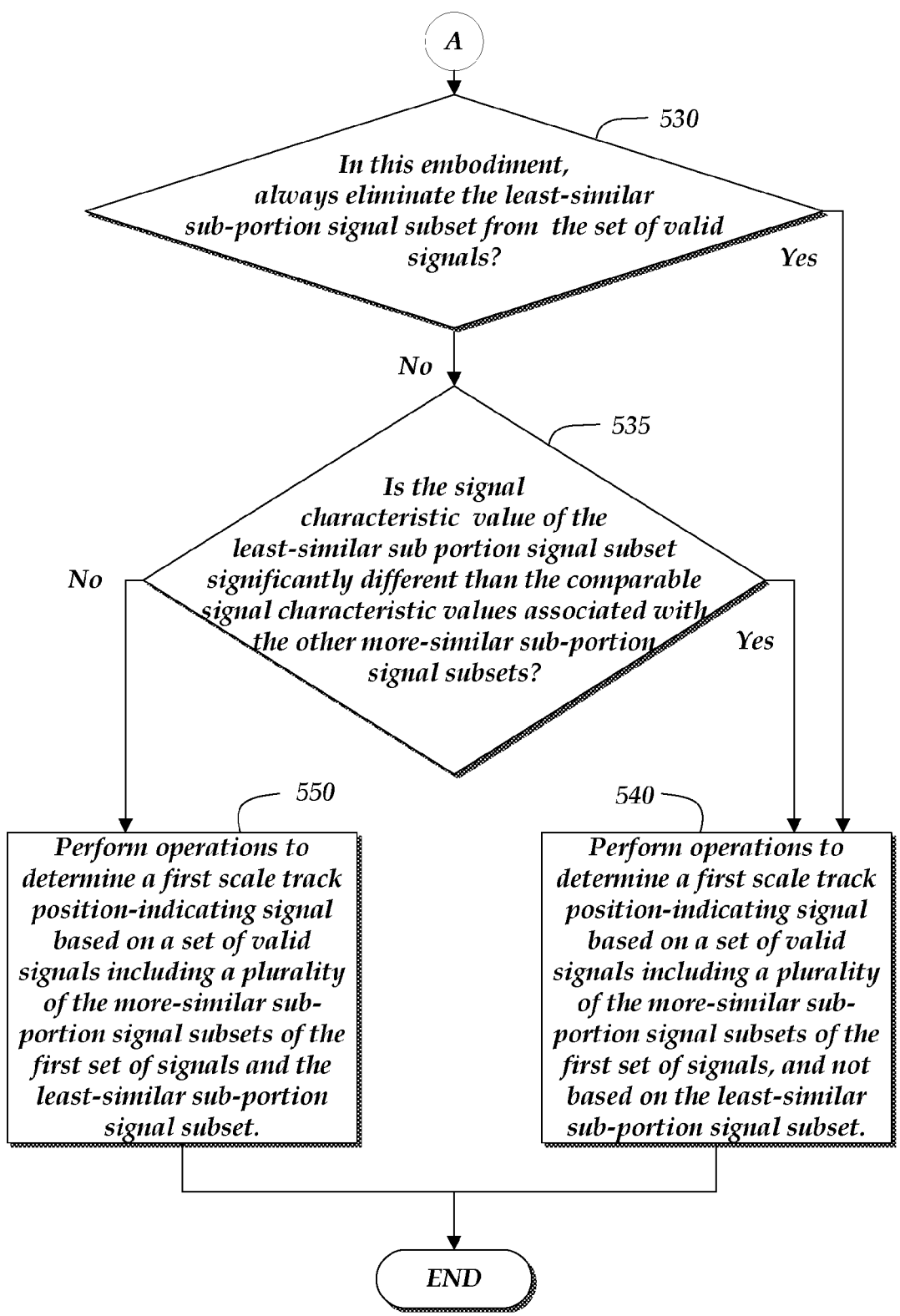

FIGS. 5A and 5B show a flow diagram 500 illustrating a method for operating an optical encoder configuration, such as the optical encoder configuration 100, in accordance with various embodiments disclosed herein. In particular, flow diagram 500 shows a method which may be implemented in various embodiments as a processing routine for determining a relative position between a scale element and a detector along a measuring axis direction with reduced influence from the effects of scale track defects and contaminants. As illustrated in FIG. 5A, at a block 505, light is output from an illumination portion. At a block 510, the light from the illumination portion is received by a scale element including at least a first scale track including a first scale track pattern extending along the measuring axis direction and a first periodic spatially modulated light pattern corresponding to the first scale track pattern is output along a first light path. At a block 515, the first periodic spatially modulated light pattern is received along the first light path with a signal processing electronics comprising a first detector portion and an analyzer portion, and the received first periodic spatially modulated light pattern is spatially filtered by the first detector portion and a first set of position indicating signals is output by the first detector portion. The first detector portion comprises a first set of at least three respective sub-portions, the at least three respective sub-portions operate to produce a first set of signals comprising at least three respective sub-portion signal subsets that have nominally the same signal characteristics when the first scale track is not contaminated or defective (e.g., as previously outlined with reference to FIG. 3 or 4). At a block 520, the first set of signals are input to the analyzer portion. At a block 525, the first set of signals are analyzed and a least-similar sub-portion signal subset is identified that has a corresponding signal characteristic value that is least similar to comparable signal characteristic values associated with other more-similar sub-portion signal subsets of the first set of signals. From the block 525, the process continues to a block A, which continues in FIG. 5B to a block 530.

It should be appreciated that FIG. 5B may be interpreted as encompassing two alternative embodiments for operating an optical encoder configuration with reduced influence from the effects of scale track defects and contaminants. As illustrated in FIG. 5B, at a decision block 530, if the current embodiment always (unconditionally) eliminates the least-similar sub-portion signal subset from the set of valid signals that are used to determine a position-indicating signal, then operation continues to a block 540 where operations are performed to determine a first scale track position-indicating signal based on a set of valid signals including a plurality of the more-similar sub-portion signal subsets of the first set of signals, and not including the least-similar sub-portion signal subset, and then the routine ends. At the decision block 535, if it is determined that the signal characteristic value of the least-similar sub-portion signal subset is significantly different than the comparable signal characteristic values associated with the other more-similar sub-portion signal subsets, then the process continues to the block 540 where operations are performed to determine a first scale track position-indicating signal based on a set of valid signals including a plurality of the more-similar sub-portion signal subsets of the first set of signals, and not including the significantly different least-similar sub-portion signal subset. If, at the decision block 535, the signal characteristic value of the least-similar sub-portion signal subset is not found to be significantly different than the comparable signal characteristic values associated with the other more-similar sub-portion signal subsets, then the process continues to a block 550, where operations are performed to determine a first scale track position-indicating signal based on a set of valid signals including a plurality of the more-similar sub-portion signal subsets of the first set of signals and the least-similar sub-portion signal subset (which, in this case, is not significantly different from the more-similar sub-portion signal subsets). Various embodiments for determining whether or not the signal characteristic value of the least-similar sub-portion signal subset is significantly different than the comparable signal characteristic values associated with the other more-similar sub-portion signal subsets have been previously described with reference to FIG. 3, for example. Following the operations of blocks 540 or 550, the routine ends.

It will be appreciated from the foregoing description that in embodiments that always (unconditionally) eliminate the least-similar sub-portion signal subset from the set of valid signals that are used to determine a position-indicating signal, this fact may be known ahead of time, and corresponding routines need not actually include or perform operations associated with the blocks 530, 535 and/or 550. In an analogous manner, in embodiments that do not always eliminate the least-similar sub-portion signal subset from the set of valid signals that are used to determine a position-indicating signal (e.g., if the least-similar sub-portion signal subset is sufficiently similar to other valid sub-portion signal subsets), this fact may be known ahead of time, and corresponding routines need not actually include or perform operations associated with the block 530.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An encoder configuration usable to determine a relative position between a scale element and a detector along a measuring axis direction with reduced influence from the effects of scale track defects and contaminants, the encoder configuration comprising:
   an illumination portion;
   a scale element including at least a first scale track including a first scale track pattern extending along the measuring axis direction and arranged to receive light from the illumination portion and output a first periodic spatially modulated light pattern corresponding to the first scale track pattern along a first light path; and
   a signal processing electronics comprising a first detector portion and a valid signal selection portion, the first detector portion configured to receive the first periodic spatially modulated light pattern along the first light path, and to spatially filter the received first periodic spatially modulated light pattern and output signals that depend on the relative position,
   wherein:
   the first detector portion comprises a first set of at least three respective sub-portions, the at least three respective sub-portions producing a first set of signals comprising at least three respective sub-portion signal subsets that have nominally the same signal characteristics when the first scale track is not contaminated or defective; and
   the signal processing electronics is configured to:
      input the first set of signals to the valid signal selection portion;
      analyze the first set of signals and identify a least-similar sub-portion signal subset that has a corresponding signal characteristic value that is least similar to comparable signal characteristic values associated with other more-similar sub-portion signal subsets of the first set of signals; and
      perform operations to determine a first scale track position-indicating signal based on a set of valid signals, the valid set of signals including:
         a plurality of the more-similar sub-portion signal subsets of the first set of signals; and
         not including the least-similar sub-portion signal subset if the signal characteristic value of the least-similar sub-portion signal subset is significantly different than the comparable signal characteristic values associated with the other more-similar sub-portion signal subsets.

2. The encoder configuration of claim 1, wherein the signal processing electronics is configured to determine that the signal characteristic value of the least-similar sub-portion signal subset is significantly different than the comparable signal characteristic values of the more-similar sub-portion signal subsets when the signal characteristic value of the least-similar sub-portion signal subset falls outside of an allowed difference range defined based on at least one of the signal characteristic values associated with the more-similar sub-portion signal subsets.

3. The encoder configuration of claim 2, wherein the allowed difference range is defined to coincide with the range of the signal characteristic values associated with the more-similar sub-portion signal subsets.

4. The encoder configuration of claim 2, wherein the signal processing electronics is configured to:
 define the allowed difference range such that it is larger than the range of the signal characteristic values associated with the more-similar sub-portion signal subsets;
 determine that the signal characteristic value of the least-similar sub-portion signal subset is not significantly different than the comparable signal characteristic values of the more-similar sub-portion signal subsets when the signal characteristic value of the least-similar sub-portion signal subset does not fall outside of the allowed difference range; and
 perform operations to determine the first scale track position-indicating signal based on a plurality of the more-similar sub-portion signal subsets and based on the least-similar sub-portion signal subset, if the signal characteristic value of the least-similar sub-portion signal subset is not significantly different than the comparable signal characteristic values associated with other more-similar sub-portion signal subsets.

5. The encoder configuration of claim 4, wherein a lower limit of the allowed difference range is a first defined difference amount less than one of (a) the lowest of the signal characteristic values associated with the more-similar sub-portion signal subsets, (b) an average of at least two signal characteristic values associated with the more-similar sub-portion signal subsets, and (c) the highest of the signal characteristic values associated with the more-similar sub-portion signal subsets.

6. The encoder configuration of claim 5, wherein the first defined difference amount is proportional to one of (a) the lowest of the signal characteristic values associated with the more-similar sub-portion signal subsets, (b) an average of at least two signal characteristic values associated with the more-similar sub-portion signal subsets, (c) the highest of the signal characteristic values associated with the more-similar sub-portion signal subsets, (d) a difference between two signal characteristic values associated with the more-similar sub-portion signal subsets, and (e) a measure of distribution associated with the signal characteristic values of the more-similar sub-portion signal subsets.

7. The encoder configuration of claim 4, wherein an upper limit of the allowed difference range is a second defined difference amount more than one of (a) the lowest of the signal characteristic values associated with the more-similar sub-portion signal subsets, (b) an average of at least two signal characteristic values associated with the more-similar sub-portion signal subsets, and (c) the highest of the signal characteristic values associated with the more-similar sub-portion signal subsets.

8. The encoder configuration of claim 7, wherein the second defined difference amount is proportional to one of (a) the lowest of the signal characteristic values associated with the more-similar sub-portion signal subsets, (b) an average of at least two signal characteristic values associated with the more-similar sub-portion signal subsets, (c) the highest of the signal characteristic values associated with the more-similar sub-portion signal subsets, (d) a difference between two signal characteristic values associated with the more-similar sub-portion signal subsets, and (e) a measure of distribution associated with the signal characteristic values of the more-similar signals.

9. The encoder configuration of claim 1, wherein the first set of at least three respective sub-portions each comprise a first similar detector element set and are positioned apart by an integer number of spatial periods of the first spatially modulated light pattern along the measuring axis direction.

10. The encoder configuration of claim 9, wherein the similar detector element set comprises one of a single detector element, a set of non-adjacent detector elements having the same spatial phase, a set of non-adjacent detector elements including a plurality of spatial phases, and a set of adjacent detector elements including a plurality of spatial phases.

11. The encoder configuration of claim 10, wherein the set of adjacent detector elements including a plurality of spatial phases are evenly spaced over an integer number of spatial periods of the first spatially modulated light pattern.

12. The encoder configuration of claim 11, wherein the valid signal selection portion comprises at least one signal combiner, the similar detector element set comprises the set of adjacent detector elements including a plurality of spatial phases, and each respective sub-portion signal subset is input to a signal combiner which outputs a respective combined signal that provides the signal characteristic value that corresponds to that respective sub-portion signal subset.

13. The encoder configuration of claim 10, wherein:
 the similar detector element set of the first set of at least three respective sub-portions comprises one of a single detector element having a first spatial phase, and a set of non-adjacent detector elements each having the first spatial phase;
 the detector portion further comprises a second set and a third set of at least three respective sub-portions, the second set of at least three respective sub-portions producing a second set of signals comprising at least three respective sub-portion signal subsets that have nominally the same signal characteristics when the first scale track is not contaminated or defective, the third set of at least three respective sub-portions producing a third set of signals comprising at least three respective sub-portion signal subsets that have nominally the same position-indicating signal characteristics when the first scale track is not contaminated or defective;
 the second set of at least three respective sub-portions each comprise a second similar detector element set and are positioned apart by an integer number of spatial periods of the first spatially modulated light pattern along the measuring axis direction, and the third set of at least three respective sub-portions each comprise a third similar detector element set and are positioned apart by an integer number of spatial periods of the first spatially modulated light pattern along the measuring axis direction;
 the second similar detector element set comprises one of a single detector element having a second spatial phase, and a set of non-adjacent detector elements each having the second spatial phase, and the third similar detector element set comprises one of a single detector element having a third spatial phase, and a set of non-adjacent detector elements each having the third spatial phase; and the signal processing electronics is configured to:
  input the second set of signals to the valid signal selection portion and input the third set of signals to the valid signal selection portion;
  analyze the second set of signals and identify a least-similar sub-portion signal subset that has a signal characteristic value that is least similar to comparable signal characteristic values associated with other more-similar sub-portion signal subsets of the second set of signals;
  analyze the third set of signals and identify a least-similar sub-portion signal subset that has a signal characteristic value that is least similar to comparable signal characteristic values associated with other more-similar sub-portion signal subsets of the third set of signals; and
  perform operations to determine a first scale track position-indicating signal based on a set of valid signals including:
    the plurality of the more-similar sub-portion signal subsets of the first set of signals, a plurality of the more-similar sub-portion signal subsets of the second set of signals and a plurality of the more-similar sub-portion signal subsets of the third set of signals, and
    not including the least-similar sub-portion signal subset of the first set of signals if its signal characteristic value is significantly different than the comparable signal characteristic values associated with the other more-similar sub-portion signal subsets of the first set of signals, not including the least-similar sub-portion signal subset of the second set of signals if its signal characteristic value is significantly different than the comparable signal characteristic values associated with the other more-similar sub-portion signal subsets of the second set of signals, and not including the least-similar sub-portion signal subset of the third set of signals if its signal characteristic value is significantly different than the comparable signal characteristic values associated with the other more-similar sub-portion signal subsets of the third set of signals.

14. The encoder configuration of claim 1, wherein:
the encoder configuration is an absolute encoder configuration;
the scale element includes a fine scale track having a fine wavelength and at least one absolute scale track having a wavelength longer than the fine wavelength; and
the first scale track is one of the at least one absolute scale track.

15. A method for determining a relative position between a scale element and a detector along a measuring axis direction with reduced influence from the effects of scale track defects and contaminants, the method comprising:
  outputting light from an illumination portion;
  receiving the light from the illumination portion with a scale element including at least a first scale track including a first scale track pattern extending along the measuring axis direction, and outputting a first periodic spatially modulated light pattern corresponding to the first scale track pattern along a first light path;
  receiving the first periodic spatially modulated light pattern along the first light path with a signal processing electronics comprising a first detector portion and a valid signal selection portion, and spatially filtering the received first periodic spatially modulated light pattern and outputting signals that depend on the relative position, wherein the first detector portion comprises a first set of at least three respective sub-portions, the at least three respective sub-portions operate to produce a first set of signals comprising at least three respective sub-portion signal subsets that have nominally the same signal characteristics when the first scale track is not contaminated or defective; and
  processing the first set of signals with the signal processing electronics, comprising:
    inputting the first set of signals to the valid signal selection portion;
    analyzing the first set of signals and identify a least-similar sub-portion signal subset that has a corresponding signal characteristic value that is least similar to comparable signal characteristic values associated with other more-similar sub-portion signal subsets of the first set of signals; and
    performing operations to determine a first scale track position-indicating signal based on a set of valid signals, the valid set of signals including:
      a plurality of the more-similar sub-portion signal subsets of the first set of signals; and
      not including the least-similar sub-portion signal subset if the signal characteristic value of the least-similar sub-portion signal subset is significantly different than the comparable signal characteristic values associated with the other more-similar sub-portion signal subsets.

16. The method of claim 15, wherein processing the first set of signals with the signal processing electronics comprises determining that the signal characteristic value of the least-similar sub-portion signal subset is significantly different than the comparable signal characteristic values associated with the other more-similar sub-portion signal subsets when the signal characteristic value of the least-similar sub-portion signal subset falls outside of an allowed difference range defined based on at least one of the signal characteristic values associated with the more-similar sub-portion signal subsets.

17. The method of claim 16, wherein the allowed difference range is defined to coincide with the range of the signal characteristic values associated with the more-similar sub-portion signal subsets.

18. The method of claim 16, wherein processing the first set of signals with the signal processing electronics comprises:
  defining the allowed difference range such that it is larger than the range of the signal characteristic values associated with the more-similar sub-portion signal subsets;
  determining that the signal characteristic value of the least-similar sub-portion signal subset is not significantly different than the comparable signal characteristic values of the more-similar sub-portion signal subsets when the signal characteristic value of the least-similar sub-portion signal subset does not fall outside of the allowed difference range; and
  performing operations to determine a first scale track position-indicating signal based on a set of valid signals, the valid set of signals including:
    a plurality of the more-similar sub-portion signal subsets of the first set of signals; and including the least-similar sub-portion signal subset if the signal characteristic value of the least-similar sub-portion signal subset is not significantly different than the comparable signal characteristic values associated with the other more-similar sub-portion signal subsets.

19. The method of claim 18, wherein defining the allowed difference range includes defining a lower limit of the allowed difference range that is a first defined difference amount less than one of (a) the lowest of the signal characteristic values associated with the more-similar sub-portion signal subsets, (b) an average of at least two signal characteristic values associated with the more-similar sub-portion signal subsets, and (c) the highest of the signal characteristic values associated with the more-similar sub-portion signal subsets.

20. The encoder configuration of claim 19, wherein the first defined difference amount is proportional to one of (a) the lowest of the signal characteristic values associated with the more-similar sub-portion signal subsets, (b) an average of at least two signal characteristic values associated with the more-similar sub-portion signal subsets, (c) the highest of the signal characteristic values associated with the more-similar sub-portion signal subsets, (d) a difference between two signal characteristic values associated with the more-similar sub-portion signal subsets, and (e) a measure of distribution associated with the signal characteristic values of the more-similar sub-portion signal subsets.

* * * * *